Figure 1:
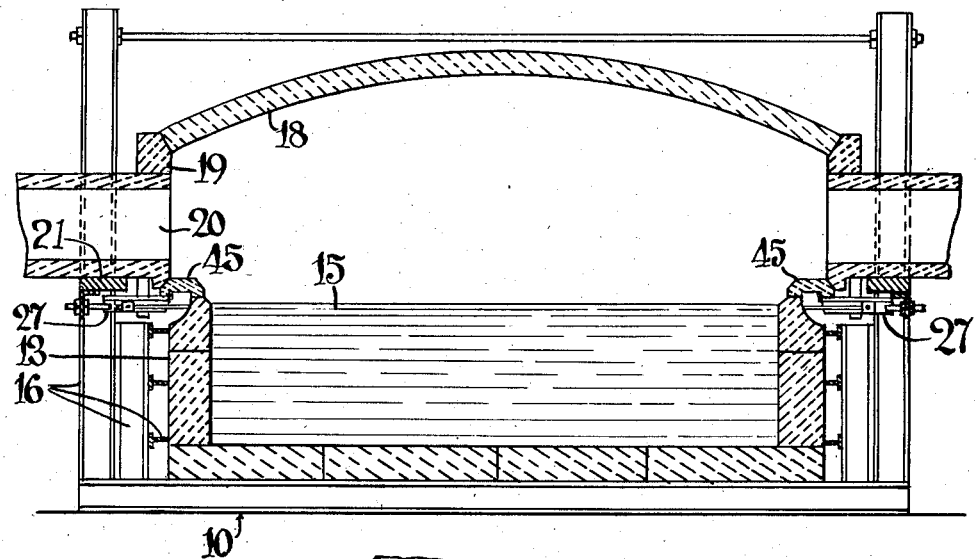

May 29, 1945.　　　H. L. HALBACH　　　2,377,080
WALL STRUCTURE FOR TANKS
Filed March 11, 1942　　　2 Sheets-Sheet 1

Inventor
Howard L. Halbach
By
Olen E. Bee
Attorney

May 29, 1945.  H. L. HALBACH  2,377,080
WALL STRUCTURE FOR TANKS
Filed March 11, 1942  2 Sheets-Sheet 2
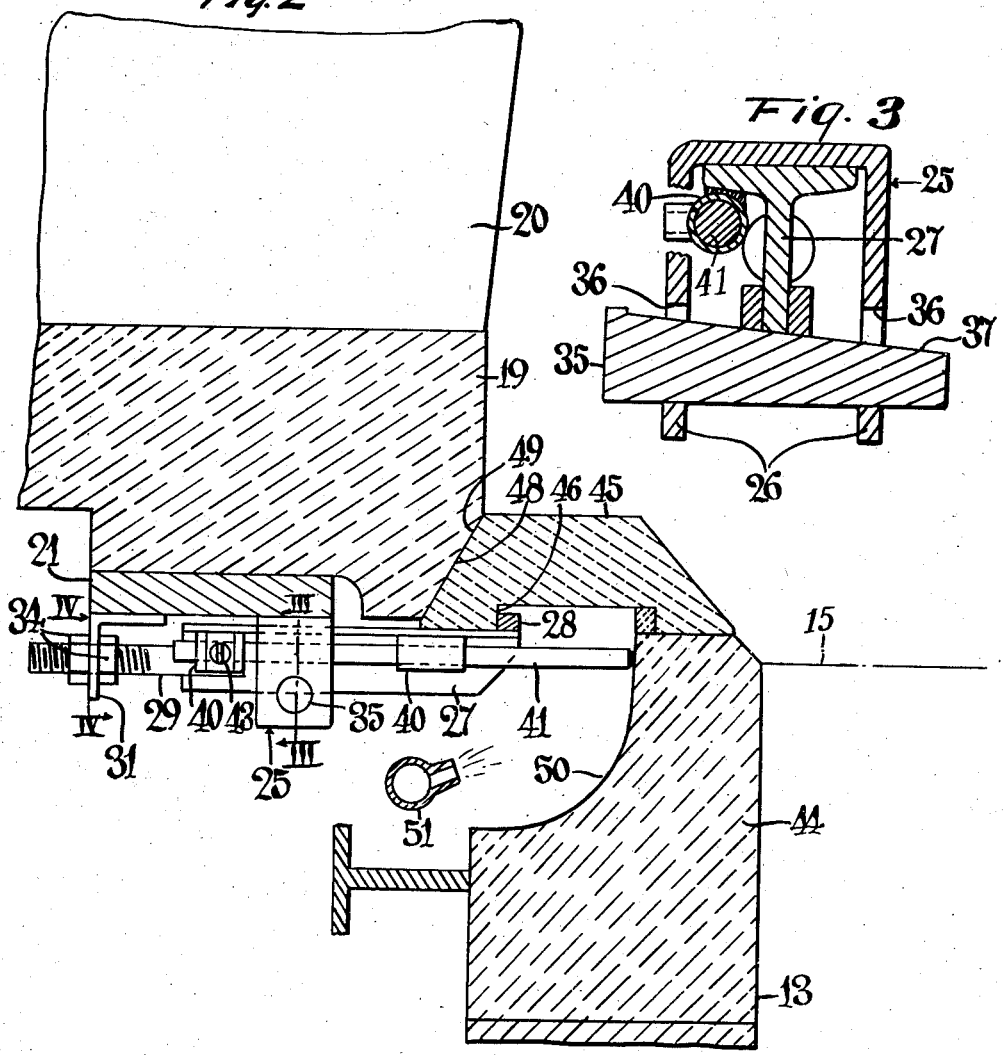
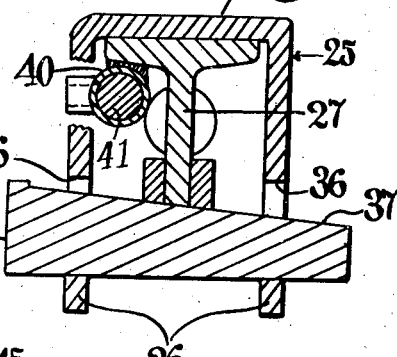
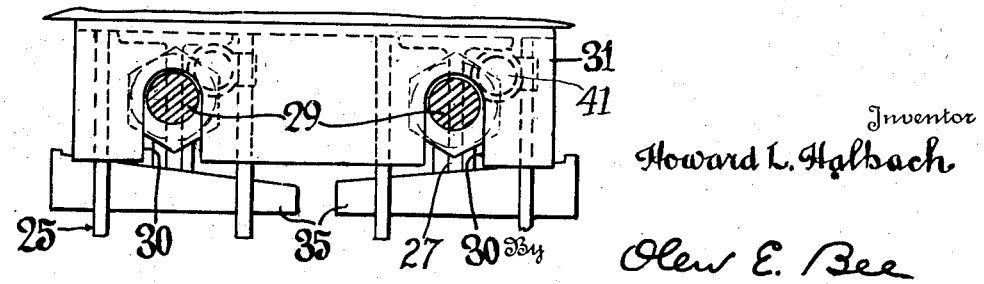
Inventor
Howard L. Halbach
By Olen E. Bee
Attorney Patented May 29, 1945

2,377,080

UNITED STATES PATENT OFFICE 2,377,080

WALL STRUCTURE FOR TANKS

Howard L. Halbach, Clarksburg, W. Va., assignor to Pittsburgh Plate Glass Company, Allegheny County, Pa., a corporation of Pennsylvania Application March 11, 1942, Serial No. 434,233

8 Claims. (Cl. 49—54)

This invention relates to tanks or furnaces in which glass-making batch is to be melted and it has particular relation to refractory arrangement in vital portions of the tank.

One object of the invention is to provide an improved tank wall construction.

Another object of the invention is to provide an improved structure for resisting erosive effect of molten glass bath upon refractories of a bath-containing tank.

Another object of the invention is to provide an improved structure and mounting of tuck stones employed in the walls of glass melting furnaces and adaptable for adjustment to various positions to close or seal spaces between upper and lower wall sections of the furnaces.

Another object of the invention is to provide an improved arrangement of refractory at the junction between upper and lower wall sections of furnace structure.

In the operation of tanks or furnaces employed in the melting of glass-making batch, the erosive effect of the molten glass bath is intensified along the tank walls at the location of the bath level. Therefore, frequent replacement of this part of the tank wall heretofore has been necessary despite the fact that various arrangements have been proposed for increasing the resistance of the walls and thus prolonging the life of the refractories. The invention herein described is designed to reduce the disadvantageous effects of the bath upon refractory and includes an improved installation of tuck stone structure. The refractories are composed of hard materials, such as so-called Corhart, which consists principally of a mixture of diaspore or calcined bauxite and clay or kaolin. Carrier devices which at least partially support the tuckstone can be manipulated to such positions as to move the tuckstone substantially horizontally and in vertical directions.

Figure 5:
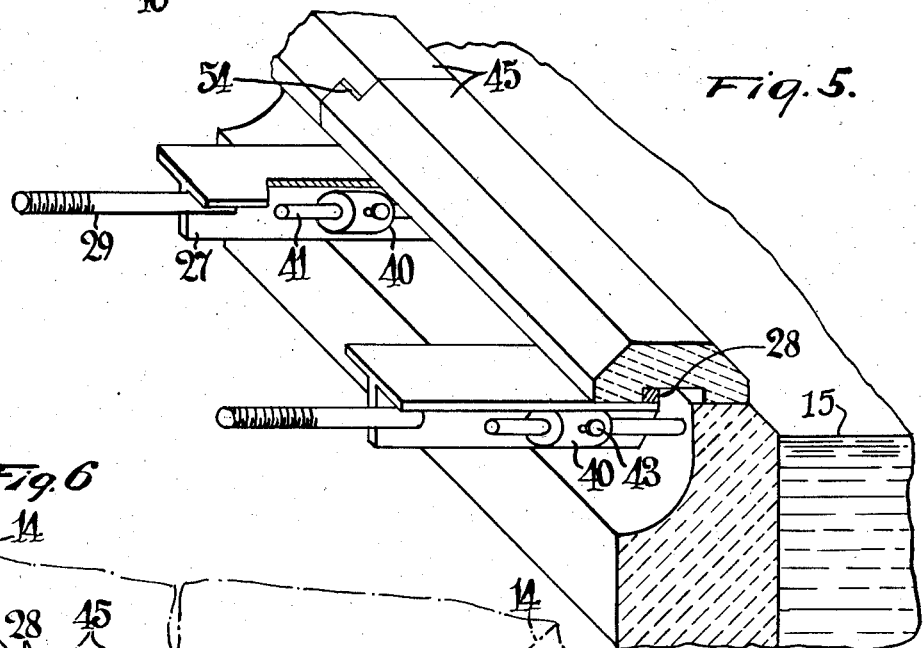
Figure 6:
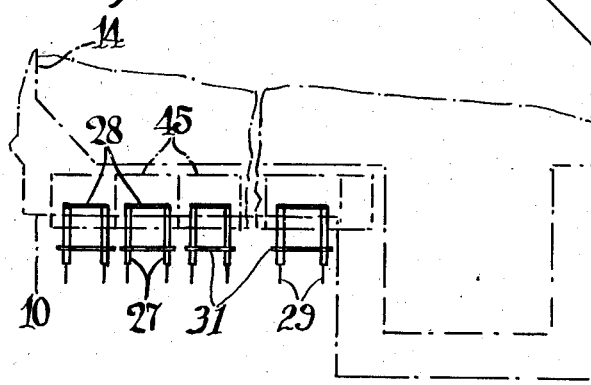

In the drawings:

Fig. 1 is a vertical section of a glass melting tank; Fig. 2 is a fragmentary cross section on a larger scale of a tank wall construction including details of elements; Fig. 3 is a cross section taken substantially along the line III—III of Fig. 2; Fig. 4 is a fragmentary view partially in vertical section taken substantially along the line IV—IV of Fig. 2; Fig. 5 is a fragmentary perspective of a wall section in which portions are shown in vertical section and adjustable mountings for tuck stones are included; and Fig. 6 is a fragmentary diagrammatic plan of refractory supporting elements and illustrating in broken lines the position of a tank with respect thereto.

In practicing the invention, there is provided a tank 10 comprising side walls 13 and end walls 14 for containing a molten glass bath 15 therein. Reinforcing frame superstructure 16 of conventional form maintains the refractories in place.

Crown or roof refractories 18 rest upon the upper side or jamb walls 19 through which fuel ports 20 are formed. The latter walls are offset outwardly from the upper extremities of the lower side walls 13. The superstructure 16 includes horizontal beams 21 upon which the upper walls 19 rest, and yokes 25 having depending flanges 26 (Fig. 3) are welded or otherwise rigidly secured upon the lower side of the beam 21. Metal beams 27, such as T-beams extend slidably through the yokes between the flanges 26 and project inwardly toward the sides of the tank at substantially right angles thereto.

Bars 28 running adjacent the tank longitudinally of the sides thereof are rigidly carried upon the inner end portions of the beams 27 which they bridge. The outer end portion of each beam 27 is provided with a screw threaded rod 29 rigidly secured thereto and extending through notches 30 (Fig. 4) formed in an angle plate 31 that is rigidly secured to the outer lower side of the beam 21. These notches open downwardly for the purpose of facilitating the mounting and adjusting of the rods therein. Lock nuts 34 threaded on the rods 29 and secured upon the inner and outer sides of the angle plate provide for adjustment of the beams 27 toward and away from the tank side wall 13. A tapered bar or wedge 35 extends transversely through openings 36 in the flanges 26 of each yoke and its upper sloping surface 37 partially supports the beam 27 in such manner that, by wedging the bar 35 transversely against the beam, the position of the latter can be varied vertically.

A pair of axially aligned horizontal guides 40 are welded or otherwise secured longitudinally of each beam 27 to support an extension thereof which can be in the form of a rod 41 slidably and axially therein. This rod can be adjusted in the guides 40 and can be secured rigidly in adjusted positions by means of a set screw 43 screwthreaded through the wall of one of the guides of each beam 27.

Tuck stones 45 which are laid in courses along the opposite side walls 13 of the tank have their marginal portions supported upon upper sections 44 of these walls, and their outer marginal portions are supported upon the inner end portions of the beams 27. The lower sides of the tuck stones 45 are recessed to form shoulders 46 and the bars 28 are hooked or abutted behind these shoulders in order that the outward or rearward movement of the beams 27 draws the tuck stones outwardly. The lower portion of the upper wall 19 has an inclined face 48 against which a complemental inclined face 49 of each tuck stone is abutted. The upper portion of the tank side wall 13 is cut away along the sections 44 to form a recess 50 which is defined at its upper extremity by the lower sides of the tuck stones. By manipulating the nuts 34 and the wedging bar 35, the inclined face 49 of the tuck stone can be abutted at proper height closely against the adjacent inclined face 48 of the upper wall 19 while maintaining proper contact of the tuck stone on the tank wall section 44. In this manner, an effective bridge is provided between the upper edges of the tank basin wall 13 and the lower edges of the roof supporting walls 19.

From the above description it will be apparent that carrier devices or apparatus which serve to actuate the refractory blocks, such as tuckstones, are capable of positioning the tuckstones at locations where they are held positively in sealing relation between the upper and lower wall sections of the tank.

An effective seal can thus be maintained between the tuck stone 45 and both the inclined surface 48 and the upper edge of the wall section 44. At this location individual adjustment of the tuck stones can be had at any time to compensate for refractory displacement or other disruption of the seal that might be caused by the action of heat, either during or after the heating of the tank has been brought to operating values.

Conduit construction 51 which can be in the form of a manifold, or the like, provides passage for the circulation of air in the recess 50 against the upper thinner portion of the wall section 44 and lower portions of the tuck stones 45. The cooling action of such air prevents excessive erosion and prolongs the life of the refractories involved.

Since the tuck stones are maintained in substantially sealed relation to adjacent offset wall sections, the air blast directed into the recess 50 can be generated at as high velocity as desired to effect efficient cooling of the refractories 44 and without danger of adversely affecting the atmosphere inside the tank. It should be noted that the space directly between each fuel port 20 (Fig. 2) and the edge of the bath 15 is not shielded by projecting refractories. The inner side of the tuck stone is inclined and set back sufficiently to insure this condition and thus the heat from the fuel ports 20 is directed to the bath at its edges, as well as farther out toward its central area. The end-to-end fitting of the tuck stones is of improved character by virtue of shiplapping, as indicated at 54 (Fig. 5). The sealing relation along the refractory wall and from tuck stone to tuck stone is thus maintained all along the tank walls without difficulty.

It is sometimes impossible to prevent the upper sections of the wall 13 from failing and in such event, there would be danger of broken portions of refractory being displaced outwardly unless precautions were taken to prevent such action. The rods 41 are adjusted in such manner that their inner end portions are positioned immediately adjacent the rear upper sides of the sections 44. Thus in case the refractory fails, it will be prevented from being displaced until such time as proper repairs can be made.

Although only one form of the invention has been shown and described in detail, it will be apparent to those skilled in the art that the invention is not so limited, but that various changes can be made therein without departing from the spirit of the invention or from the scope of the appended claims.

I claim:

1. In a glass melting tank, an upper wall section and a lower wall section spaced therefrom, said upper and lower wall sections having inner sides adapted to face toward the interior of the tank and also having outer sides, a portion of the upper wall section being offset outwardly from a portion of a lower wall section, means for supporting the upper and lower wall sections in their spaced relation, refractory blocks resting at least partially upon the lower wall section and movable on the latter, and actuating means connected to the blocks and movable outwardly while the blocks are in contact with the lower wall section to draw the blocks outwardly and hold them against the offset portion of the upper wall section.

2. In a glass melting tank, an upper wall section and a lower wall section spaced therefrom, said upper and lower wall sections having inner sides adapted to face toward the interior of the tank and also having outer sides, a portion of the upper wall section being offset outwardly from a portion of a lower wall section, means for supporting the upper and lower wall sections in their spaced relation, actuating means movable toward and away from the upper portion of the lower wall section, and a refractory block connected to said actuating means, said block including portions resting upon the lower wall section and having portions disposed in close proximity to the upper wall section and said block being movable outwardly while in contact with said lower wall section in response to operation of said actuating means and into abutting relation against the offset portion of the upper wall section.

3. In a glass melting tank an upper wall section and a lower wall section spaced therefrom, said upper and lower wall sections having inner sides adapted to face toward the interior of the tank and also having outer sides, a portion of the upper wall section being offset laterally from a portion of a lower wall section, means for supporting the upper and lower wall sections in their spaced relation, a refractory block having an inner portion resting at least partially upon the lower wall section and having an outer portion extending outwardly from the lower wall section, said block being in close proximity to the upper wall section and in position to be moved into sealing relation with the latter, carrier means supporting the outer portion of the block, guiding means supporting the carrier means for movement of the latter toward and away from the upper extremity of the lower wall section, connections joining the carrier means and the refractory block to render the block movable along said lower wall section into contact with the offset portion of the upper wall section in response to the movement of the carrier means away from the lower wall section.

4. In a glass melting tank an upper wall section and a lower wall section spaced therefrom, said upper and lower wall sections having inner sides adapted to face toward the interior of the tank and also having outer sides, a portion of the upper wall section being offset laterally from a portion of a lower wall section, means for supporting the upper and lower wall sections in their spaced relation, a refractory block having an inner portion resting at least partially upon the lower wall section and having an outer portion extending outwardly from the lower wall section, said block being in close proximity to the upper wall section and in position to be moved into sealing relation with the latter while in contact with said lower wall section, carrier means supporting the outer portion of the block, guiding means supporting the carrier means for movement of the latter toward and away from the upper extremity of the lower wall section, connections joining the carrier means and the refractory block to render the block movable into contact with the offset portion of the upper wall section in response to the movement of the carrier means away from the lower wall section, said carrier means having an extension directed toward the upper side of the lower wall section to a position immediately adjacent thereto to maintain said lower wall section against outward displacement in case of rupture thereof.

5. In a glass melting tank, an upper wall section, a lower wall section below and offset in spaced relation to the upper wall section, said upper and lower wall sections having inner sides adapted to face toward the interior of the tank and having outer sides facing away from the tank, actuating apparatus movable in substantially vertical and horizontal directions and disposed adjacent the spaced portions of the wall sections, block refractory at least partially bridging the space between the upper and lower wall sections and connected to said actuating apparatus, means supporting said actuating apparatus for movement of the latter in the vertical and horizontal directions, said actuating apparatus including means to move the block refractory in vertical and horizontal directions into substantially sealing relation between the upper and lower wall sections.

6. In a glass melting tank, an upper wall section, a lower wall section below and offset in spaced relation to the upper wall section, said upper and lower wall sections having inner sides adapted to face toward the interior of the tank and having outer sides facing away from the tank, a series of refractory blocks at least partially spanning the space between the upper and lower wall sections, a block actuating apparatus connected to each refractory block and movable in substantially vertical and horizontal directions adjacent the spaced portions of the wall sections, and means supporting the actuating apparatus for movement in vertical and horizontal directions, each of said actuating apparatus including means to move the block to which it is connected in both vertical and horizontal directions into substantially sealing relation between the spaced upper and lower wall sections.

7. In a glass melting tank including a lower wall section for enclosing a molten glass bath and having an upper wall section spaced above and to one side of the lower section, tuck stone structure having inner edge portions resting in rocking and sliding relation upon the lower wall section and substantially bridging the space between the upper and lower wall sections, carrier means movable upwardly and downwardly and substantially horizontally adjacent the upper extremity of the lower wall section, means connecting the outer marginal portion of the tuck stone structure to said carrier means, said carrier means including devices for raising and lowering the outer portion of the tuck stone structure as the inner portion thereof rocks upon the lower wall section, and said carrier means also including devices for moving the tuck stone structure substantially horizontally along the upper portion of the lower wall section.

8. In a tank block adjusting apparatus having a refractory block at least partially supported thereon, a plurality of substantially parallel block carrying members adapted to project toward the side wall of a glass melting tank, a member joining the block carrying members and constituting therewith a unitary structure, means supporting said block carrying members for movement of the latter in substantially vertical and horizontal directions, means connected to the block carrying members to adjust them substantially horizontally, and means also connected to the block carrying members to adjust the latter upwardly and downwardly.

HOWARD L. HALBACH.